US009641483B2

(12) United States Patent
Albrecht

(10) Patent No.: US 9,641,483 B2
(45) Date of Patent: May 2, 2017

(54) METHOD OF PROVIDING A NAMING SERVICE INSIDE AN INDUSTRIAL COMMUNICATION SYSTEM, AND A ROUTER

(71) Applicant: Siemens Aktiengesellschaft, Munich (DE)

(72) Inventor: Harald Albrecht, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 14/698,085

(22) Filed: Apr. 28, 2015

(65) Prior Publication Data
US 2015/0312213 A1 Oct. 29, 2015

(30) Foreign Application Priority Data
Apr. 29, 2014 (EP) .................................... 14166376

(51) Int. Cl.
G06F 15/16 (2006.01)
H04L 29/12 (2006.01)
H04L 29/08 (2006.01)

(52) U.S. Cl.
CPC ...... H04L 61/3015 (2013.01); H04L 61/3025 (2013.01); H04L 67/12 (2013.01); H04L 61/2015 (2013.01); H04L 61/2092 (2013.01); H04L 61/6059 (2013.01)

(58) Field of Classification Search
USPC .................. 709/223, 229, 245; 370/252, 338
See application file for complete search history.

(56) References Cited

U.S. PATENT DOCUMENTS

| 7,561,553 | B2* | 7/2009 | Venkitaraman | ....... H04W 8/082 370/338 |
| 7,734,745 | B2* | 6/2010 | Gloe | ................. H04L 29/12066 709/223 |
| 7,747,592 | B2 | 6/2010 | Thomas | |
| 7,991,913 | B2* | 8/2011 | Yan | ..................... H04L 12/2898 709/229 |

(Continued)

FOREIGN PATENT DOCUMENTS

EP    14166194.2    4/2014
WO   WO 2007144364 A1   12/2007

OTHER PUBLICATIONS

Park et al:"IPv6 Extensions for DNS Plug and Play"; draft-park-ipv6-extensions-dns-pnp-00.txt; ISSN: 0000-0004; XP015004780; 2003; Apr. 1, 2003.

(Continued)

Primary Examiner — Quang N Nguyen
(74) Attorney, Agent, or Firm — Cozen O'Connor

(57) ABSTRACT

Router advertisements containing name information from superordinate subnetworks are received by routers associated with subordinate subnetworks. The router advertisements are supplemented with a topological and/or hierarchical name component associated with the respective router and are distributed inside the respective subordinate subnetwork. Communication terminals independently generate their device name from topological and/or hierarchical name components and a unique name component inside their respective subnetwork.

12 Claims, 3 Drawing Sheets

(56) References Cited

U.S. PATENT DOCUMENTS

| | | | |
|---|---|---|---|
| 8,175,089 B2 * | 5/2012 | Hall | H04L 29/12066 |
| | | | 709/245 |
| 8,194,661 B2 | 6/2012 | Campbell | |
| 2002/0188757 A1 | 12/2002 | Yoon et al. | |
| 2004/0230446 A1 | 11/2004 | Kim | |
| 2005/0041671 A1 | 2/2005 | Mizutani | |
| 2005/0047348 A1 * | 3/2005 | Suzuki | H04L 29/12207 |
| | | | 370/252 |
| 2010/0281146 A1 | 11/2010 | Lee | |

OTHER PUBLICATIONS

Soohong Park et al: "DNS Configuration in IPv6: Approaches, Analysis, and Deployment Scenarios"; IEEE Internet computing, IEEE Service center—Institute of Electrical and electronics engineers; bd. 17; nr, 4; pp. 48-56; ISSN: 1089-7801; DOI: 10.1109/MIC.2012.96; XP011516336; 2013; Jul. 1, 2013.

Office Action (and German translation) dated Jul. 10, 2016 which issued in the corresponding Russian Patent Application No. 2015116271/08(025325).

* cited by examiner

METHOD OF PROVIDING A NAMING SERVICE INSIDE AN INDUSTRIAL COMMUNICATION SYSTEM, AND A ROUTER

BACKGROUND OF THE INVENTION

Industrial automation systems are used to monitor, control and regulate technical processes, particularly in the fields of production, process, and building automation. Such systems enable operation of control devices, sensors, machines and industrial installations, which are intended to be carried out as autonomous as possible and independent of human interventions. Due to the continuously increasing importance of information technology for automation systems that comprise numerous networked control and computer units, methods for reliably providing functions that are distributed over an automation system and are intended to provide monitoring, control and regulation functions are becoming increasingly important.

Interruptions in communication connections between computer units of an industrial automation system or automation devices may result in undesirable or unnecessary repetition of transmission of a service request. This causes additional utilization of communication connections of the industrial automation system, which may result in further system disturbances or faults. In addition, messages that have not been transmitted or have not been fully transmitted may prevent an industrial automation system from changing to or remaining in a safe operating state, for example. This may ultimately result in failure of a complete production installation and a costly production standstill. A particular problem in industrial automation systems regularly results from message traffic having a comparatively large number of messages but relatively short messages, as a result of which the above problems are intensified.

WO 2007/144364 A1 describes a method for networking an automated installation comprising at least one cell with a subnetwork. The subnetwork is connected to a further subnetwork of the automated installation via a router. A multicast group that extends over both subnetworks is provided for networking the automated installation. The multicast group is used, to detect a communication network address of a communication network interface of a subassembly. Here, the subassembly of the multicast group has previously been associated via the communication network address and the communication network interface has previously been connected to the subnetwork. A name is allocated to the communication network interface of the subassembly using the communication network address. A further communication network address of the communication network interface of the subassembly, which has at least one part of a numerical representation of the name, is determined in a further step.

An older European patent application with the application file reference 14166194.2 discloses a method for configuring a communication device inside an industrial automation system, wherein a configuration unit of the communication device transmits a datagram containing a configuration request to a configuration server. The configuration server allocates at least one first topological device name component to the communication device in response to the configuration request, wherein the device name component is associated with a spatial or hierarchical arrangement of the configuration server. Each forwarding distribution unit adds a further topological device name component associated with a spatial or hierarchical arrangement of the respective forwarding distribution unit. The configuration unit of the communication device uses the topological device name components and a unique name component inside its subnetwork to generate its device name.

US 2005 0041671 A1 discloses a communication system having at least one first and one second router, wherein the second router requests at least one IPv6 address prefix from the first router. Here, the first router comprises a storage unit for IPv6 address prefixes, wherein at least one IPv6 address prefix is disclosed in response to the request from the second router. The second router comprises a unit for generating a further IPv6 address prefix based on the IPv6 address prefix disclosed by the first router. The further IPv6 address prefix is used by a communication device connected to the second router to generate an IPv6 address and is disclosed by the second router for this purpose.

U.S. Pat. No. 8,194,661 B2 describes a method for automatically configuring a communication device inside a segmented communication network, wherein a monitoring unit checks whether a received IPv6 data packet comprises a router advertisement or a router solicitation. In the case of a router solicitation, a MAC sender address of the data packet is removed from the IPv6 data packet by the monitoring unit. In addition, the monitoring unit inserts an external MAC address into the IPv6 data packet to forward the latter as a multicast message to a router. In the case of a router advertisement, the monitoring unit removes a MAC router address from the IPv6 data packet and instead inserts an internal MAC address into the IPv6 data packet in order to forward the latter as a unicast message to the communication device to be configured.

SUMMARY OF THE INVENTION

In one aspect, it is an object of the present disclosure to provide a method for providing a naming service inside an industrial communication system, where the method is easy to implement and makes it possible to efficiently and reliably address networked automation devices using conveniently manageable names. It is also an object of the present disclosure to provide a suitable communication device.

In accordance with one embodiment of the method, IPv6 prefixes are distributed in respectively subordinate subnetworks by routers by messages containing router advertisements. The router advertisements comprise a topological and/or hierarchical name component of the respective router, the topological and/or hierarchical name component being associated with a spatial or hierarchical arrangement of the respective router. Router advertisements containing name information from superordinate subnetworks are received by routers associated with subordinate subnetworks and are supplemented with a topological and/or hierarchical name component associated with the respective router and are distributed inside the respective subordinate subnetwork. Communication terminals, for example, communication devices without routing functions, independently generate their device name from topological and/or hierarchical name components and a unique name component inside their respective subnetwork.

In one embodiment, only a basic domain name is set up as a starting point for automatically setting up a namespace, for example. Subordinate naming hierarchical levels are automatically completed starting from this starting point. This makes it possible to easily start up series production machines because, due to the above-mentioned automatic completion, only names that are unique are selected at the machine level. In principle, the method does not require any centralizing or coordinating entity, such as a Profinet IO controller, for its implementation.

In one embodiment, the router advertisements containing name information from superordinate subnetworks are received by routers associated with subordinate subnetworks by a respective functional unit for implementing a distributed naming service (e.g., a name hierarchy daemon). The router advertisements containing name information from superordinate subnetworks are preferably supplemented, by routers associated with subordinate subnetworks, with a topological and/or hierarchical name component associated with the respective router by this respective functional unit for implementing the distributed naming service. A functional unit for implementing a distributed naming service is advantageously respectively integrated in each router. This simplifies the implementation of the method.

According to another embodiment, the router advertisements supplemented with a topological and/or hierarchical name component associated with the respective router are distributed inside the respective subordinate subnetwork by a respective functional unit for distributing router advertisements (e.g., a router advertisement daemon). A functional unit for distributing router advertisements is advantageously respectively integrated in each router, thereby allowing the method to be used in a consistent manner.

The messages containing router advertisements are preferably transmitted according to the Internet Control Message Protocol Version 6. In one embodiment, the messages containing router advertisements each comprise an option that is used to transmit the supplemented topological and/or hierarchical name components. This may be, for example, a manufacturer-specific router advertisement option. Consequently, the method can be integrated into existing communication systems with relatively little effort.

The communication terminals preferably independently generate their device name from topological and/or hierarchical name components and a unique name component inside their respective subnetwork by a respective functional unit for implementing a distributed naming service (e.g., a name hierarchy daemon). In one embodiment, a functional unit for implementing a distributed naming service is respectively integrated in each communication terminal. The method can therefore be used in a consistent manner in all communication devices.

According to another embodiment, topological and/or hierarchical name components can be made available to routers by DHCPv6 servers (Dynamic Host Configuration Protocol) and can then be distributed by the routers. For example, information relating to a basic domain or relating to subordinate hierarchical or topological levels may be provided by one or more DHCPv6 configuration servers, individually or in combination. This makes it possible to considerably reduce administrative effort and to eliminate potential sources of error.

The router according to an embodiment of the present disclosure is suitable and intended for carrying out a method according to the preceding statements. Specifically, the router is configured and set up in such a manner that IPv6 prefixes are distributed in respectively subordinate subnetworks using messages containing router advertisements. The router advertisements comprise a topological and/or hierarchical name component of the respective router, the topological and/or hierarchical name component being associated with a spatial or hierarchical arrangement of the router. In addition, the router is configured and set up in such a manner that router advertisements containing name information from superordinate subnetworks are received and are supplemented with a topological and/or hierarchical name component associated with the router and are distributed inside the respective subordinate subnetwork.

A functional unit for implementing a distributed naming service is preferably provided for the purpose of receiving the router advertisements containing name information from superordinate subnetworks. In addition, this functional unit may be additionally provided for the purpose of supplementing the router advertisements containing name information with the topological and/or hierarchical name component associated with the router. A functional unit for distributing router advertisements is advantageously provided for distributing the router advertisements supplemented with the topological and/or hierarchical name component associated with the router. This provides a modular concept for integrating the different embodiments of the present disclosure in existing communication systems.

Other objects and features of different embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Aspects of the present invention are explained in more detail below using an exemplary embodiment based on the drawing, in which.

DETAILED DESCRIPTION OF THE PRESENTLY PREFERRED EMBODIMENTS

Figure 1:
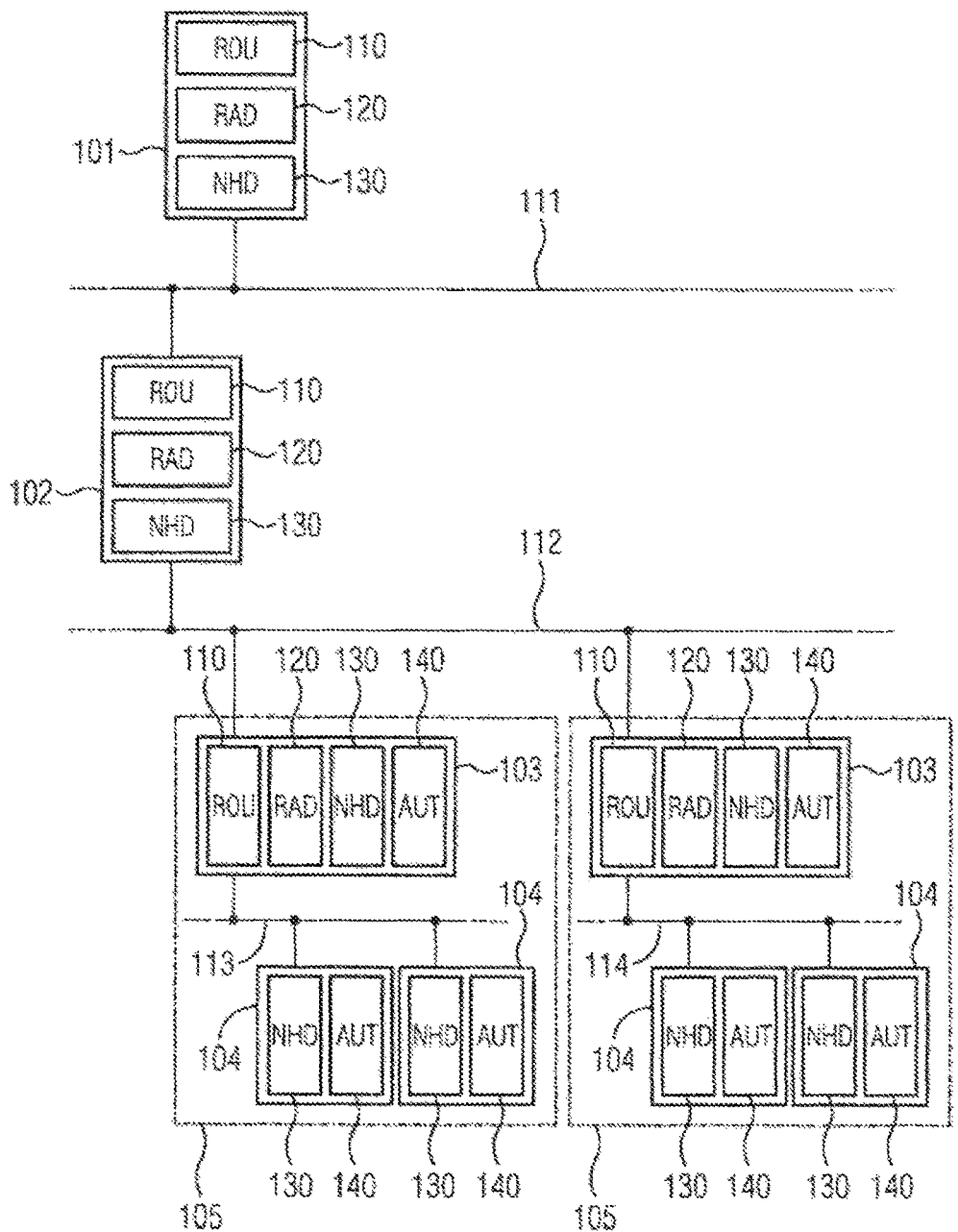
FIG. 1 shows a schematic illustration of an industrial automation system having a plurality of IPv6 routers, subnetworks and automation devices to be configured.

The industrial automation system schematically illustrated in FIG. 1 comprises a router 101 that is associated with a basic domain, a plurality of subnetworks 111-114 having associated routers 102 or automation devices 103 having routing functions, and a plurality of modular automation devices 104 without routing functions. The automation devices 104 are, for example, programmable logic controllers of a complex machine 105 and each comprise a communication module having a functional unit 130 for implementing a distributed naming service (name hierarchy daemon) and an automation module 140. A complex machine 105 may also comprise automation devices 103 having an integrated routing module 110 and a functional unit 120 for distributing router advertisements (router advertisement daemon) inside a subnetwork 113, 114 inside the machine.

The automation modules 140 each comprise at least one central unit and an input/output unit. The input/output units are used to interchange control and measurement variables between the respective automation device 103, 104 and a machine or apparatus controlled by the automation device 103, 104. The central units of the automation modules 140 are provided, in particular, for determining suitable control variables from recorded measurement variables. In the present exemplary embodiment, the above components of the automation devices 103, 104 are connected to one another via a backplane bus system.

In the present exemplary embodiment, in addition to a routing module 110, all routers 101, 102 comprise a router advertisement daemon 120 and a name hierarchy daemon 130. The router advertisement daemons 120 are used by the routers 101, 102 or automation devices 103 having routing functions to distribute IPv6 prefixes in respectively subordinate subnetworks 111-114. Here, the IPv6 prefixes are parts of messages containing router advertisements that are transmitted in accordance with the Internet Control Message Protocol Version 6. The router advertisements comprise a topological and/or hierarchical name component of the respective router, the topological and/or hierarchical name component being associated with a spatial or hierarchical arrangement of the respective router.

Figure 2:
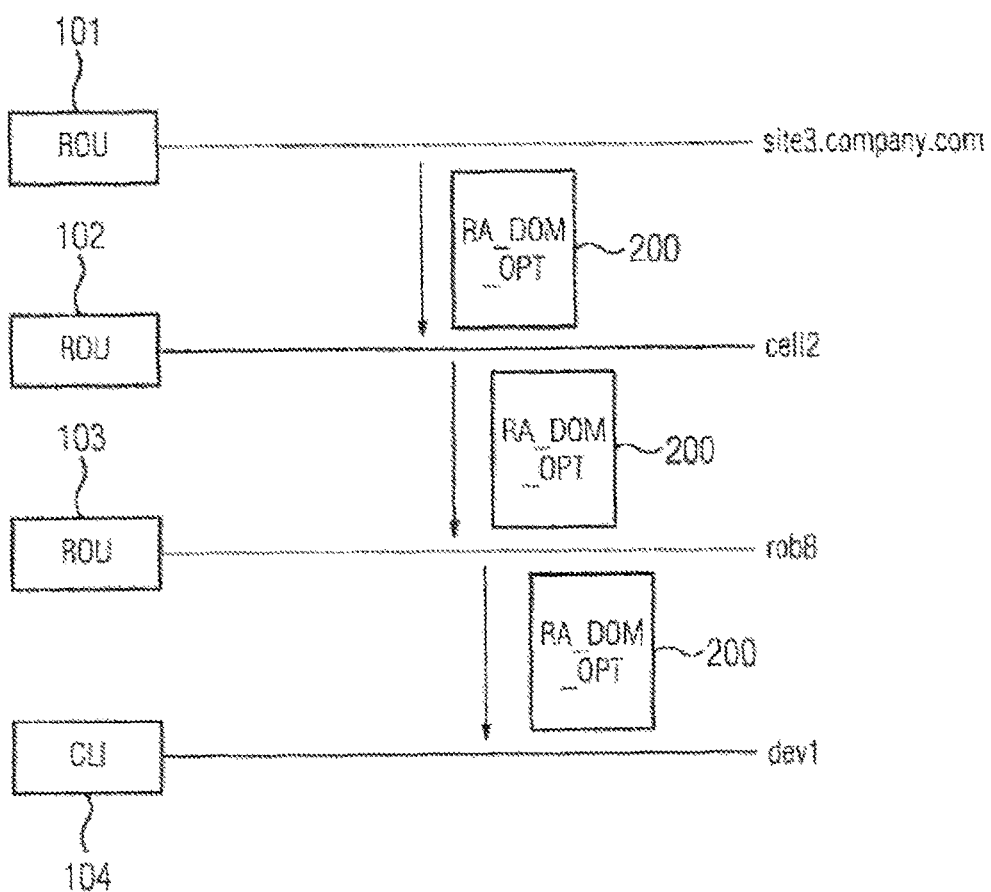
FIG. 2 shows a schematic illustration of data interchange between an IPv6 router and an automation device to be configured.

According to FIG. 2, the router 101 that is associated with the basic domain adds the name component "site3.company.com" to its messages 200 containing router advertisements using a manufacturer-specific option RA_DOM_OPT in the present exemplary embodiment. Each subordinate router 102 or each automation device 103 having routing functions adds a further topological and/or hierarchical name component that is associated with a spatial or hierarchical arrangement of the respective router 102 or automation device 103. Corresponding spatial or hierarchical details, "cell2" and "rob8" in the present exemplary embodiment, are optionally added in this case to an already existing option RA_DOM_OPT or are attached as further options RA_DOM_OPT.

Router advertisements containing name information from superordinate subnetworks are received by routers 102 or automation devices 103 associated with subordinate subnetworks by the respective name hierarchy daemon 130 and are supplemented with a topological and/or hierarchical name component associated with the respective router 102 or automation device 103. The router advertisements containing the supplemented name information are distributed inside the respective subordinate subnetwork by the respective router advertisement daemon 120.

The automation devices 103, 104 independently each generate their device name from received topological and/or hierarchical name components and a unique name component inside their respective subnetwork by their name hierarchy daemon 130. For this purpose, the automation devices 103, 104 evaluate the manufacturer-specific option RA_DOM_OPT of the router advertisements.

The routers 101, 102 or the automation devices 103 having routing functions are configured to carry out the method described above, in particular in such a manner that IPv6 prefixes are distributed in respectively subordinate subnetworks by messages containing router advertisements, and in such a manner that router advertisements containing name information from superordinate subnetworks are received and are supplemented with a topological and/or hierarchical name component associated with the router and are distributed inside the respective subordinate subnetwork.

Figure 3:
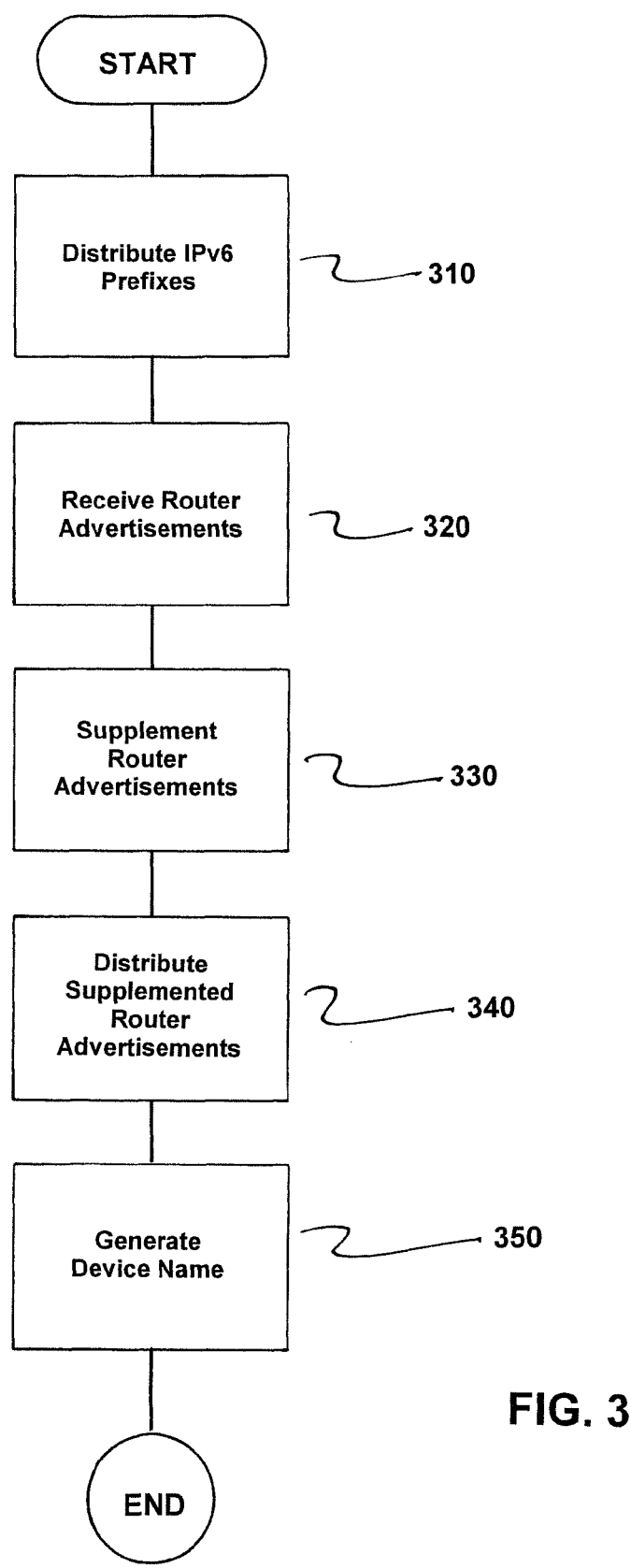
FIG. 3 shows a flowchart of a method of providing a naming service inside an industrial communication system, consistent with an exemplary embodiment.

FIG. 3 illustrates a method of providing a naming service inside an industrial communication system, consistent with an exemplary embodiment of the present disclosure. The method includes subordinate subnetworks, superordinate subnetworks, communication terminals, and routers.

In step 310, IPv6 prefixes in the respectively subordinate subnetworks are distributed via routers with messages containing router advertisements. The router advertisements comprise a topological and/or hierarchical name component of the respective router, and the topological and/or hierarchical name component are associated with a spatial or hierarchical arrangement of the respective router.

In step 320, router advertisements containing name information are received from superordinate subnetworks by routers associated with the subordinate subnetworks.

In step 330, the router advertisements are supplemented with a topological and/or hierarchical name component associated with the respective router.

In step 340, the supplemented router advertisements are distributed inside the respective subordinate subnetwork.

In step 350, the communication terminals independently generate their device name from topological and/or hierarchical name components and a unique name component inside their respective subnetwork.

Thus, while there have been shown and described and pointed out fundamental novel features of the application as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of providing a naming service inside an industrial communication system comprising subordinate subnetworks, superordinate subnetworks, communication terminals, and routers, the method comprising:

distributing IPv6 prefixes in the respectively subordinate subnetworks via routers with messages containing router advertisements, the router advertisements comprising a topological and/or hierarchical name component of the respective router, and the topological and/or hierarchical name component being associated with a spatial or hierarchical arrangement of the respective router;

receiving router advertisements containing name information from superordinate subnetworks by routers associated with the subordinate subnetworks;

supplementing the router advertisements with a topological and/or hierarchical name component associated with the respective router;

distributing the supplemented router advertisements inside the respective subordinate subnetwork; and independently generating, by communication terminals, their device name from topological and/or hierarchical name components and a unique name component inside their respective subnetwork;

wherein the router advertisements containing name information from superordinate subnetworks are received by routers associated with subordinate subnetworks by a respective functional unit for implementing a distributed naming service;

wherein at least one topological and/or hierarchical name component is made available to at least one router by at least one DHCPv6 server and is distributed by said router.

2. The method as claimed in claim 1, wherein the router advertisements containing name information from superordinate subnetworks are supplemented, by routers associated with subordinate subnetworks, with a topological and/or hierarchical name component associated with the respective router by the respective functional unit for implementing the distributed naming service.

3. The method as claimed in claim 1, wherein a functional unit for implementing a distributed naming service is integrated in each router, respectively.

4. The method as claimed in claim 1, wherein the router advertisements supplemented with a topological and/or hierarchical name component associated with the respective router are distributed inside the respective subordinate subnetwork by a respective functional unit for distributing router advertisements.

5. The method as claimed in claim 4, wherein a functional unit for distributing router advertisements is respectively integrated in each router.

6. The method as claimed in claim 1, wherein the messages containing router advertisements are transmitted according to the Internet Control Message Protocol Version 6.

7. The method as claimed in claim 6, wherein the messages containing router advertisements each comprise an option that is used to transmit the supplemented topological and/or hierarchical name components.

8. The method as claimed in claim 1, wherein the communication terminals independently generate their device name from topological and/or hierarchical name components and a unique name component inside their respective subnetwork by a respective functional unit for implementing a distributed naming service.

9. The method as claimed in claim 8, wherein a functional unit for implementing a distributed naming service is respectively integrated in each communication terminal.

10. A router in an industrial communication system,
wherein the router is configured such that IPv6 prefixes are distributed in respectively subordinate subnetworks using messages containing router advertisements,
wherein the router advertisements comprise a topological and/or hierarchical name component of the respective router, and wherein the topological and/or hierarchical name component are associated with a spatial or hierarchical arrangement of the router; and
wherein the router is configured such that router advertisements containing name information from superordinate subnetworks are received and are supplemented with a topological and/or hierarchical name component associated with the router and are distributed inside the respective subordinate subnetwork;
wherein communication terminals independently generate their device name from topological and/or hierarchical name components and a unique name component inside their respective subnetwork;
wherein a functional unit for implementing a distributed naming service is provided for receiving the router advertisements containing name information from superordinate subnetworks;
wherein at least one topological and/or hierarchical name component is made available to the router by at least one DHCPv6 server and is distributed by the router.

11. The router as claimed in claim 10, wherein the functional unit for implementing the distributed naming service is additionally provided for the purpose of supplementing the router advertisements containing name information with the topological and/or hierarchical name component associated with the router.

12. The router as claimed in claim 10, wherein a functional unit for distributing router advertisements is provided for distributing the router advertisements supplemented with the topological and/or hierarchical name component associated with the router.

* * * * *